United States Patent [19]

Morishita et al.

[11] Patent Number: 4,495,905
[45] Date of Patent: Jan. 29, 1985

[54] STARTING DEVICE

[75] Inventors: Akira Morishita; Toshinori Tanaka, both of Himeji; Kouichi Matsumoto, Tatsuno; Takeo Gotou, Himeji, all of Japan

[73] Assignee: Mitsubishi Denki Kabushiki Kaisha, Tokyo, Japan

[21] Appl. No.: 567,880

[22] Filed: Jan. 3, 1984

[30] Foreign Application Priority Data

Jan. 8, 1983 [JP] Japan .................... 58-2075

[51] Int. Cl.³ .............................. F02N 17/00
[52] U.S. Cl. ................. 123/179 F; 123/179 E; 123/179 J; 123/179 M; 123/179 R
[58] Field of Search .......... 123/179 F, 179 J, 179 K, 123/179 A, 179 R, 179 M, 179 E; 74/6, 7 C, 7 R, 8

[56] References Cited

U.S. PATENT DOCUMENTS

| | | | |
|---|---|---|---|
| 2,347,744 | 5/1944 | Lehman | 123/179 F |
| 3,378,731 | 11/1969 | Morton et al. | |
| 3,633,360 | 1/1972 | Kelley | 123/179 F |
| 3,911,734 | 11/1976 | Martin | |
| 4,169,447 | 10/1979 | Furzer | 123/179 E |
| 4,232,521 | 11/1980 | Mallofre | |
| 4,235,216 | 11/1980 | Miles | 123/179 E |
| 4,259,930 | 4/1981 | Hofbauer | 123/179 J |
| 4,347,813 | 9/1982 | Maucher et al. | 123/179 J |

Primary Examiner—Parshotam S. Lall
Attorney, Agent, or Firm—Oblon, Fisher, Spivak, McClelland & Maier

[57] ABSTRACT

A starting device comprises a first power transmitting device connected to a crank shaft of the engine of a car, a compressor driven by a power output from the first power transmitting device, an air motor whose rotary shaft is driven by feeding compressed air of the compressor through an air reservoir via an air feeding tube, a valve device placed in the air feeding tube, a second power transmitting device installed between the rotary shaft and the crank shaft, a stopping device for stopping the engine when a burden of the engine disappears during car driving, and a controlling device which causes the air motor to actuate by opening the valve device at the time of restarting the engine to control starting of the crank shaft through the second power transmitting device.

10 Claims, 2 Drawing Figures

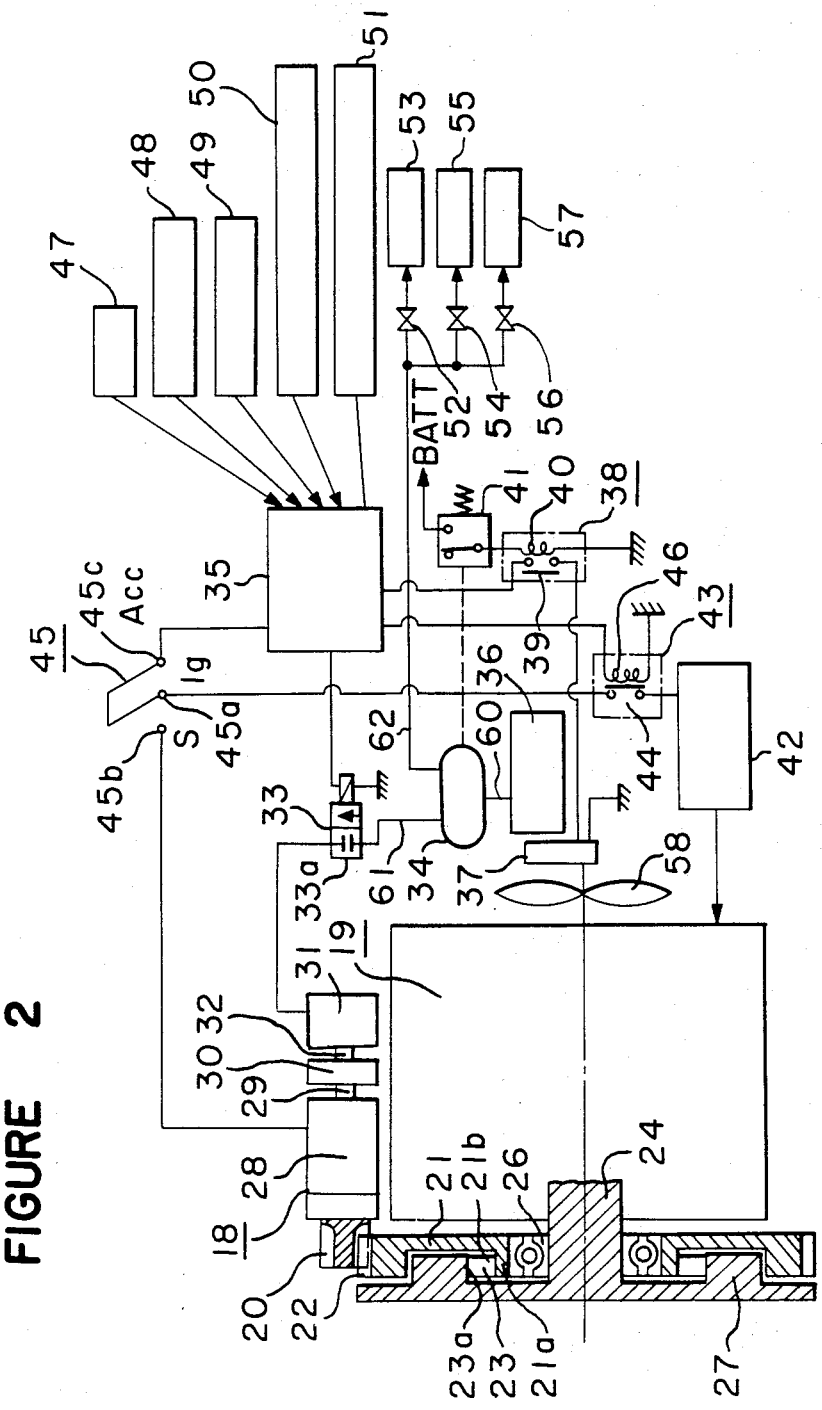

STARTING DEVICE

The present invention relates to a starting device installed in an economical fuel-consumption type car. More particularly, it relates to an improvement in a starting device equipped with an air starter.

There has been very few that cars are equipped with an air starter. A starting motor in which a d.c. motor is used as a prime mover will be described with reference to FIG. 1. In FIG. 1, the reference numeral 1 designates an engine, namely, a starting motor mountd on an internal combustion engine 2; 3 designates a car battery as a power source device for the starting motor 1; 4 designates a key switch for controlling an electromagnetic switch 5 of the starting motor 1, the key switch 4 being connected to an input terminal S for both a current coil 6 and a voltage coil 7; and 8 designates the main contact of a normally opening contact in which a movable contact 9 is adapted to be forwardly urged by a plunger 10 to be brought into contact with stationary contacts 11a and 11b, constituting a pair of contacts, whereby a d.c. motor 12 connected to one 11b of the stationary contacts is actuated by current conduction. A shift lever 13 having one end which is connected to the plunger 10 through a cam means, is caused to turn clockwisely in the direction as shown by an arrow mark in the figure, around a pivotal point 13a by the urging force of the plunger 10. The other end of the shift lever 13 is connected through a cam means to an overrunning clutch 14 which is connected to the rotary shaft 15 of the d.c. motor 12 through a spline structure so as to be moved forwardly. A pinion 16 is engaged with the overrunning clutch 14 so as to be capable of rotating in a specific direction. Forwardly urging of the overrunning clutch 14 causes the pinion 16 to interlock with a ring gear 17 of the engine 2.

The operation of the conventional starting device constructed as abovementioned will be described.

When the key switch 4 is closed, a power source voltage of the car battery 3 is applied to both the current coil 6 and the voltage coil 7 of the electromagnetic switch 5 to cause attraction of the plunger 10. Then, the main contact 8 is closed to generate a torque in the d.c. motor 12 and at the same time, the pinion 16 is interlocked with the ring gear 17 wherby the engine 2 is actuated for starting (cranking). After starting of the engine 2, revolution of the ring gear 17 may cause overrevolution of the pinion 16. However, one-way rotating-force transferring function of the overrunning clutch 14 makes only the pinion 16 cooperate with the ring gear 17 to thereby prevent the d.c. motor, which constitutes a power system preceding the overrunning clutch 14, from overrevolution or reverse actuation caused by the engine 2. When the key switch 4 is opened, the plunger 10 is returned to the original position by a return spring (not shown) with the result that the shift lever 13 is turned in the counterclockwise direction in the figure around the pivotal point 13a and the overrunning clutch 14 moves backward on and along the rotary shaft 15. The movement of the overrunning clutch 14 causes the pinion 16 to disconnect from the ring gear 17 and opens the main contact 8 to thereby deenergize the d.c. motor 12.

The conventional starting device having the construction as abovementioned had disadvantages of poor reliability in its mechanism and of overdischarging of a car battery because the pinion 16 is come to interlock with the ring gear 17 at each time of starting the engine 2 and power in the car battery is much consumed by the d.c. motor 12.

It is an object of the present invention to eliminate the disadvantage of the conventional starting device and to provide a starting device having an excellent function by constructing it in such a manner that a d.c. motor is connected to an air motor in the same axial line and air pressure source is obtained with a compressor driven by the engine.

The foregoing and the other objects of the present invention have been attained by providing a starting device comprising a first power transmitting device connected to a crank shaft of the engine of a car, a compressor driven by a power output from the first power transmitting device, an air motor whose rotary shaft is driven by compressed air of the compressor through an air reservoir via an air feeding tube, a valve device placed in the air feeding tube, a second power transmitting device installed between the rotary shaft and the crank shaft, a stopping device for stopping the engine when a burden of the engine disappears during car driving, and a controlling device which causes the air motor to actuate by opening the valve device at the time of restarting the engine to control starting of the crank shaft through the second power transmitting device.

A more complete appreciation of the invention and many of the attendant advantages thereof will be readily obtained as the same becomes better understood by reference to the following detailed description when considered in connection with the accompanying drawings, wherein:

FIG. 2 is a diagram showing, as a whole, an embodiment of the starting device of the present invention.

Figure 1:
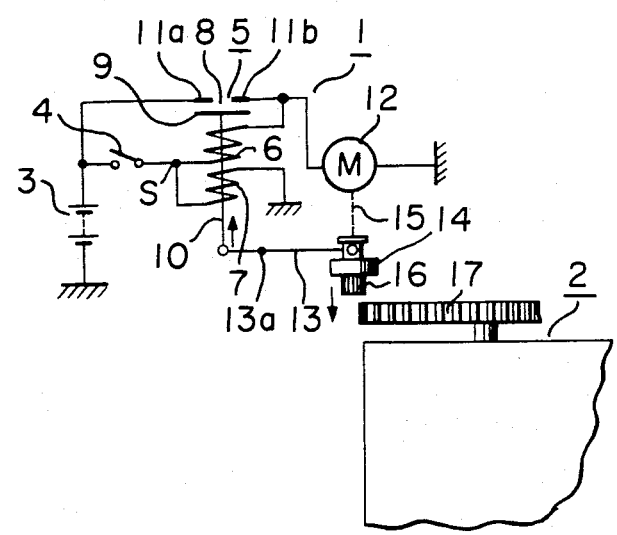
FIG. 1 is a schematic view of the conventional starting device.

An embodiment of the present invention will be described with reference to drawings.

FIG. 2 is a diagram showing a construction of an embodiment of the starting device of the present invention.

As shown in FIG. 2, a starter motor 18 is mounted on an engine or an internal combustion engine 19. A pinion 20 secured to a rotary shaft of the starter motor 18 is usually engaged with a ring gear 22 formed in the outer periphery of a ring gear-wheel 21. A cam-like sprag roller 23 of an overrunning clutch mechanism is interposed between a flywheel 27 and the ring gear-wheel 21. The cam-like sprag roller 23 is confined in a space formed between the inner surface of an annular projection 23a formed in coaxial with a crank shaft 24 of the engine 19 and the outer surface 21b of the hollow boss 21a of the ring gear-wheel 21 so that the rotational force of the ring gear-wheel 21 is transmitted to the crank shaft in only one direction due to its wedge function. A ball bearing 26 is fitted onto the crank shaft 24 so that the ring gear-wheel 21 is supported on the crank shaft 24 so as to be rotatable on the same axis of the crank shaft 24. The flywheel 27 is secured to the crank shaft 24. An internal speed-reduction starter 28 which constitutes an operating part of the starter motor 18 has a rotary shaft 29 on the rear side which is connected to the rotary shaft 32 at the output side of an air motor 31 through a one-way clutch 30 which performs connection and disconnection of the air motor to the starter motor 18. The air motor 31 is connected to a reservoir 34 through an electromagnetic valve 33 by piping. A controlling device 35 controls on-off operations of the electromagnetic valve 33 in such a manner that compressed air filling the reservoir 34 is caused to flow through air feeding pipes 61, 62, wherein the compressed air is particularly fed to air motor 31 through the air feeding pipe 61 to generate a rotational force. There is placed an air compressor 36 whose output is connectable to the crank shaft 24 through the electromagnetic clutch 37 to transmit a rotational force to the crank shaft 24. A relay 38 has a contact 39 to connect a power source to the controlling device 35 and a coil 40 which is connected to a car battery (not shown) through an air switch 41 for detecting air pressure in the reservoir 34. A unit 42 comprising a fuel controlling valve and an ignition circuit is connected to an ignition terminal 45a of a key switch 45 through a contact 44 of a relay 43. A coil 46 of the relay 43 is connected to the controlling device 35 which controls actuation of the relay 43 by feeding current. The key switch 45 further has a starter terminal 45b used for feeding current to the internal reduction starter 28 of the starter motor 18 at the time of manually starting the engine and an accessory terminal 45c connected to the power source line of the controlling device 35. The controlling device 35 receives an input signal fed from each of a car speed sensor 47, an engine revolution sensor 48 detecting revolution of the engine 19, a clutch pedal switch 49 for detecting operating condition of the clutch pedal of a car, an engine load sensor 51 for detecting burden to the engine 19, and an electrical load sensor for detecting an electrical load to be connected to a car battery (not shown).

A valve 52 is connected between a car height controlling device 53 and the reservoir 34; a valve 54 is connected between a washing pump 55 and the reservoir 34 and a valve 56 is connected between an air cushion 57 and the reservoir. There is provided a cooling fan 58 for the engine 19. The reference numeral 60 designates an inlet air feeding pipe and 61 and 62 respectively designate outlet air feeding pipes.

The operation of the starting device having the construction as abovementioned will be described. When the key switch 45 is connected to the starter terminal 45b and the ignition terminal 45a, the internal reduction starter 28 is actuated under current conduction to generate a rotational force to be transmitted to the ring gear 22. Revolution of the ring gear 22 causes revolution of the crank shaft 24 through the sprag roller 23 thereby starting the engine 19. In this case, there occurs no revolution in the air motor 31 because the one-way clutch 30 is connected between the starter motor 18 and the air motor 31 and the starter 28 is actuated with a load remaining unchanged. After the engine 19 started, there takes place disconnection of the sprag roller 23 to thereby prevent a power system preceding the ring gear-wheel 21 (namely, the starter motor 18) from overrevolution or reverse actuation caused by the engine 19. At the time of overrevolution, the sprag roller 23 tends to float on the surface (the inner surface) on which a cam undergoes a rolling movement whereby friction loss is prevented. After start of the engine 19, the key switch 45 is changed on the side of the ignition terminal 45a and the accessory terminal 45c to connect the controlling device 35 to the power source so as to initiate calculation. When the engine is under condition of other than highly loaded condition resulted at the time when a car is accelerted or goes up a slope and the revolution of the engine 19 becomes a predetermined value, the voltage of the power source is applied to the contact 39 of the relay 38 by the controlling device 35 and the air switch 41 detects pressure in the reservoir 34. When air pressure detected is lower than a predetermined value, the coil 40 is actuated by current conduction to close the contact 39 whereby the power source voltage of the controlling device 35 is applied to the electromagnetic clutch 37 and the rotational force of the crank shaft 24 is transmitted to the air compressor 36 so as to store compressed air at a predetermined pressure in the reservoir 34. When the air pressure of the reservoir 34 rises to a predetermined pressure level (for instance, 10 kg/cm$^2$), the air switch 41 detects the pressure level to cut off the current conduction to the coil 40 of the relay 38 so as to open the contact 39 with the result that the electromagnetic clutch 37 is deenergized and connection of the rotational force of the crank shaft 24 is separated from the air compressor 36 with the result of stoppage of the air compressor 36.

When the revolution of the engine 19 reaches or exceeds the predetermined value, the engine revolution sensor 48 generates a signal which causes the controlling device 35 to open the contact 39 thereby stopping current conduction to the relay 38. Thus, the electromagnetic clutch 37 is deenergized irrespective of the signal of the air switch 41 and overrevolution of the air compressor 36 caused by the engine 19 is eliminated. The air compressor 36 may be operated in such a manner that though not shown in the drawing, both a signal of the accelerating pedal switch for detecting the degree of depression of an accelerating pedal and a signal indicative of revolution from the engine revolution sensor 48 are input into the controlling device 35 to be subjected to calculation and the power source voltage is applied to the contact 39 of the relay 38 when the degree of depression of the accelerating pedal and the revolution of the engine 19 respectively exceed predetermined levels.

In case that a car stops at a crossing, a signal from the car speed sensor 47 or signals from both the car speed sensor 47 and the clutch pedal switch 49 are input into the controlling device 35 to be subjected to calculation. The controlling device causes the contact 44 to open by feeding current to the coil 46 of the relay 43 and at the same time, it interrupts current feeding to the unit 42 of the fuel control valve and the ignition circuit whereby fuel supply to the engine 19 and the operation of the ignition circuit are stopped to cause automatical stoppage of the engine 19. Then, when a starting signal generated by, for instance, depressing the clutch pedal is input into the controlling device 35, the controlling device causes elements and devices to operate successively as follows: the electromagnetic valve 33 is opened to feed compressed air stored in the reservoir 34 to the air motor 31; the rotational force produced in the air motor 31 is transmitted to the output rotary shaft 32 and is further transmitted to the rotary shaft 29 through the one-way clutch 30; the rotational force is given to the internal reduction starter 28 in which the armature (not shown) is caused to rotate, the revolution of the starter being reduced by a reduction device (not shown) installed in the starter, while the torque is increased depending on a reduction ratio; revolution of the starter 28 rotates the pinion 20 which in turn rotates the ring gear 22; and the crank shaft 24 is rotated through the sprag roller 23 to cause automatical start of the engine 19.

After the engine 19 has started, a signal of the engine revolution sensor 48 is input into the controlling device 35. As soon as the controlling device 35 detects the signal, actuation of the electromagnetic valve 35 is stopped to close the valve body 33a whereby the air motor 31 is automatically stopped by interruption of the compressed air. The one-way clutch 30 may be an overrunning clutch constructed in such a manner that the rotational force of the air motor 31 can be transmitted to the internal reduction starter 28, but the rotational force of the internal reduction starter 28 is not transmitted to the air motor 31. Further, in this embodiment, it is so constructed that when a signal of the electrical load sensor 51 is input into the controlling device 35, the engine 19 is not automatically stopped and a charging generator (not shown) is driven so that power to be consumed by an electrical load is generated.

In accordance with the starting device of the present invention, automatical start of the engine can be obtained by the rotational force of the air motor 31 and an air source for the air motor is obtained by compressed air produced in the air compressor 36 which is driven by the engine 19. Accordingly, consumption in a car battery (not shown) is minimized and an engine having energy saving effect can be obtained.

In the foregoing, though description has not been made as to a power transmission device for the air compressor 36, it is possible to install a speed increasing device such as a gearing device or a belt-driving device between the crank shaft 24 and the air compressor 36. In this case, the function of the air compressor 36 as an air source is further improved. Furthermore, the power transmission device as abovementioned may be a well-known stepless speed changing device. In this case, it is possible to obtain feed back control in which the air compressor 36 is driven at a constant speed without suffering the effect of variation in speed of the engine 19 with the consequence that the air compressor 36 can be driven under optimum condition and overrevolution of the air compressor is effectively prevented.

As described above, the starting device of the present invention increases reliability of the device and realizes a car having energy saving effect by constructing the device in such a manner that restarting of an engine is conducted by an air motor; compressed air required for operation is produced in an air compressor connected to a crank shaft of the engine through an electromagnetic clutch and the compressed air previously stored in a reservoir is used.

We claim:

1. A starting device which comprises a first power transmitting device connected to a crank shaft of the engine of a car, a compressor driven by a power output from said first power transmitting device, an air motor whose rotary shaft is driven by feeding compressed air of said compressor through an air reservoir via an air feeding tube, a valve device placed in said air feeding tube, a second power transmitting device installed between said rotary shaft and said crank shaft, a stopping device for stopping said engine when a burden of said engine disappears during car driving, and a controlling device which causes said air motor to actuate by opening said valve device at the time of restarting said engine to control starting of said crank shaft through said second power transmitting device.

2. A starting device according to claim 1 wherein a d.c. motor is connected to the rotary shaft of said air motor.

3. A starting device according to claim 2 wherein a one-way clutch is interposed between the rotary shaft of said air motor and the rotary shaft of said d.c. motor.

4. A starting device according to claim 3 wherein said second power transmitting device is provided with a revolution speed reducing device placed between the rotary shaft of said air motor and said pinion.

5. A starting motor according to claim 2 wherein said second power transmitting device is provided with a ring gear which drives a pinion secured to said air motor or said d.c. motor and which drives said crank shaft through an overrunning clutch.

6. A starting motor according to claim 5 wherein said second power transmitting device is provided with a flywheel secured to said crank shaft and a ring gear-wheel on which a ring gear is fitted, said overrunning clutch being interposed between said flywheel and said ring gear-wheel and being provided with a sprag roller constructed in such a manner of bringing said both flywheel and ring gear-wheel into connecting condition at the time of starting said crank shaft, and bringing them into disconnecting condition at the time of high speed revolution.

7. A starting device according to claim 1 wherein said first power transmitting device is provided with an electromagnetic clutch capable of transmitting the rotational power to said air compressor and wherein said controlling device controls said electromagnetic valve in such a manner that when compressed air pressure in said reservoir decreases, it renders said electromagnetic clutch to be in energized and engaged condition and when a burden to said engine becomes large, it renders said electromagnetic clutch to be deenergized and disengaged condition.

8. A starting device according to claim 7 wherein said controlling device is provided with a revolution speed detecting device for said engine to control said electromagnetic clutch to be in deenergized and disengaged condition when the revolution speed of said engine exceeds a predetermined level.

9. A starting device according to claim 1 wherein said first power transmitting device is provided with a revolution speed increasing device installed between said engine and said air compressor.

10. A starting device according to claim 1 wherein siad first power transmitting device is provided with a revolution speed variable device installed between said engine and said air compressor.

* * * * *